Patented Nov. 18, 1924.

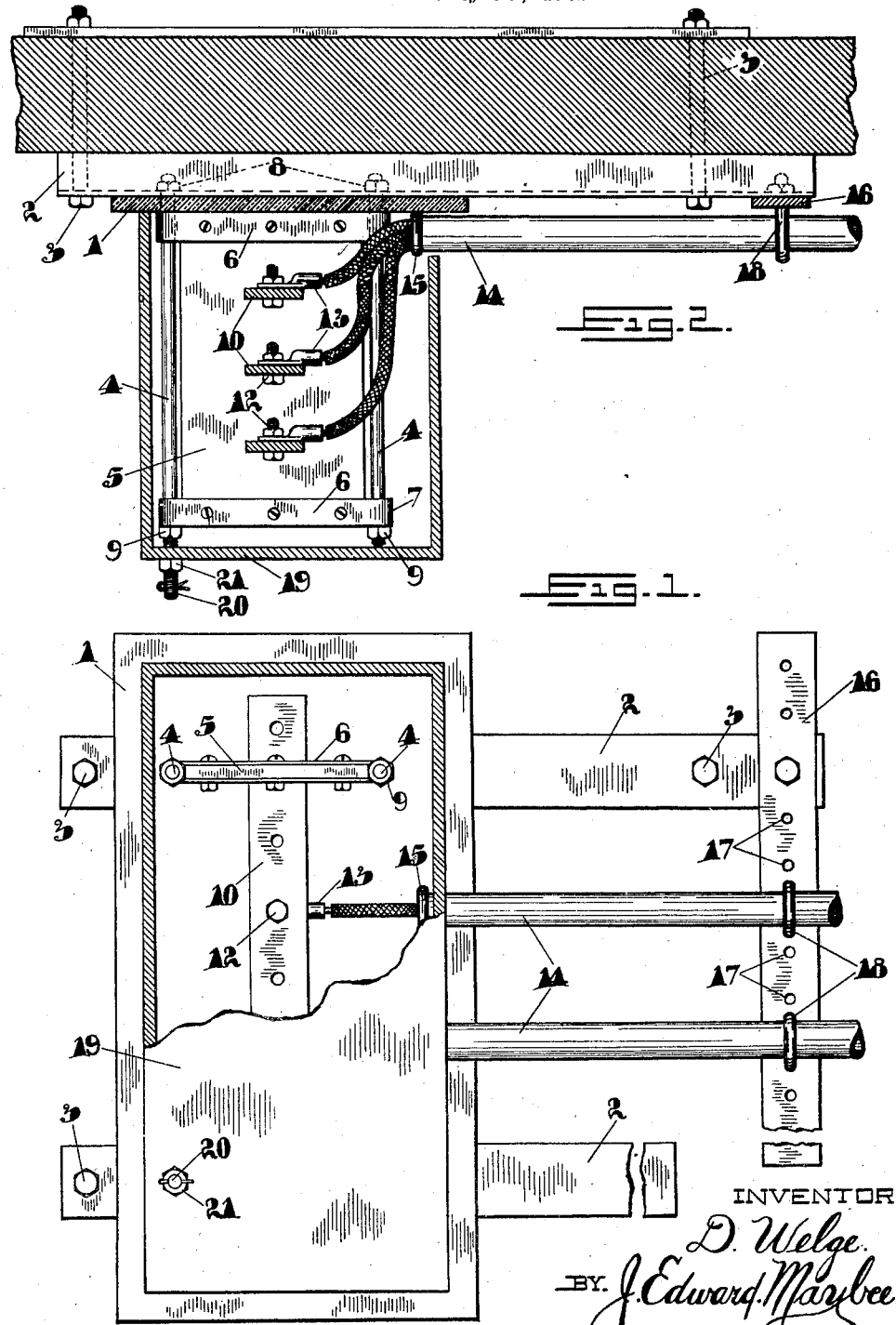

1,516,365

UNITED STATES PATENT OFFICE.

DIDRIK WELGE, OF MASON, NEVADA.

DISTRIBUTION BOX FOR ELECTRIC CIRCUITS.

Application filed July 14, 1922. Serial No. 575,069.

*To all whom it may concern:*

Be it known that I, DIDRIK WELGE, of Mason, in the State of Nevada, United States of America, a subject of the King of Norway, and now holding first papers of naturalization, issued Nov. 18, 1920, have invented certain new and useful Improvements in Distribution Boxes for Electric Circuits, of which the following is a specification.

It is possible at the present time to secure very satisfactory standard equipment for the distribution of electric energy in circuits carrying heavy currents, but under some circumstances, and particularly in the case of some mining properties the high initial cost is prohibitive. Ordinary junction boxes are sometimes employed as a cheap substitute in which the wires are connected by taped joints, but it is a difficult and sometimes dangerous matter to connect up an extra circuit in such a box. My object therefore is to devise a distribution box which will be safe, cheap, simple and strong, in which all connections are visible when the cover is removed, and which permits of the connection of extra circuits with ease and safety.

I attain the object of my invention by means of the constructions hereinafter described and illustrated in the accompanying drawings in which—

Fig. 1 is a front elevation, partly broken away, of my improved distribution box; and Fig. 2 a cross section of the same from back to front.

In the drawings like numerals of reference indicate corresponding parts in the different figures.

1 is a back of fireproof insulating material such as asbestos board. While this back may be supported in any suitable manner, a preferred construction for this purpose is illustrated in the drawings.

Two substantially parallel depending members are provided which may be secured to a wall or other support by means of bolts 3 as shown. The back is secured to the supporting members by means of bolts 4, which also serve another purpose as will hereinafter appear.

5 are plates of fireproof insulating material, which extend out from said back and are secured thereto by means of the bolts 4. To enable the bolts to perform this function I provide each end of each plate with a metal strap 6 bolted or riveted to the plate and forming loops 7 at each corner of each plate. Through these loops the bolts 4 pass and are set up by means of nuts 8 behind the supporting members 2 and nuts 9 outside the outer straps 6. In the plates 5 are formed a plurality of apertures through which pass the ends of the bus bars 10, which preferably project at each end through the supporting plates. These bus bars are provided with a series of bolts 12 by means of which the terminals of the conductors 13 may be secured to the bus bars. The conductors are preferably led through conduits or armored cables 14, which conduits are provided at their upper ends with bushings 15 to prevent chafing of the insulating jackets of the conductors.

The conductors are supported in any suitable position relative to the distribution box by a conduit supporting bar 16, which is bolted to the supporting members 2 below the back 1 and is provided with a series of holes 17 through which may pass the legs of U-bolts 18 adapted to clamp the conduits to the bar.

The number of bus bars employed will depend on the nature of the current being distributed. I show three bus bars such as would be employed for three-phase current.

The plates and bus bars are enclosed by a removable cover 19 which is held in position in the following manner. The outer ends 20 of the bolts 4 are extended so that they may pass through holes formed in the outer end of the cover. Nuts 21 screwed on these ends serve to hold the cover securely in position against the back. The lower rear edge of the cover is notched as shown particularly in Fig. 2 so that the upper ends of the conduits 14 may extend within the cover.

It will be found that a distribution box constructed as described possesses the strength and simplicity which are the most essential requirements for mill equipment. With this box it is an easy matter to add extra circuits, as the bus bars are readily accessible and are provided with the necessary holes for such operations.

The amount of space occupied by the box is a minimum relative to the number of connections provided for. All terminals are visible from above, below or from the front, and all terminals are bolted, which makes it a simple matter to change or alter connections. With the cover on, all live parts are entirely concealed.

What I claim as my invention is:—

1. A distribution box for high tension currents comprising a back formed of a plate of fireproof insulating material; bus bar supports comprising two plates of fireproof insulating material secured to and extending out from said back; bus bars carried by and extending between said plates and arranged in a series from back to front; and conductors for supplying electrical energy to said bus bars, the conductors being carried through one side of the box, each bar being provided with a plurality of openings for outlet connections.

2. A distribution box comprising a back of fireproof insulating material; bus bar supports comprising two plates of fireproof insulating material; metal straps secured to said plates forming loops adjacent each corner; bolts passing through said loops securing the plates to the back; and bus bars carried by and extending between said plates.

Signed at Mason, Nevada, this 14th day of June, 1922.

DIDRIK WELGE.

Witnesses:
RUTH CRAIG JOLLEY,
R. W. BEAMAN.